(12) United States Patent
Lee

(10) Patent No.: US 6,334,345 B1
(45) Date of Patent: Jan. 1, 2002

(54) MULTI-SECTIONAL EXTENDIBLE LOCK STRUCTURE FOR STEERING WHEELS

(75) Inventor: Chun-Chang Lee, Taipei (TW)

(73) Assignee: Tung Chu International Inc. (TW)

( * ) Notice: Subject to any disclaimer, the term of this patent is extended or adjusted under 35 U.S.C. 154(b) by 0 days.

(21) Appl. No.: 09/678,974

(22) Filed: Oct. 5, 2000

(51) Int. Cl.$^7$ .............................................. B60R 25/02
(52) U.S. Cl. ............................ 70/209; 70/226; 70/237
(58) Field of Search ........................ 70/209–212, 225, 70/226, 237, 238

(56) References Cited

U.S. PATENT DOCUMENTS

| | | | | |
|---|---|---|---|---|
| 5,031,428 A | * | 7/1991 | Jan et al. ..................... | 70/209 |
| 5,040,388 A | * | 8/1991 | Chen ............................ | 70/209 |
| 5,121,617 A | * | 6/1992 | Chen ............................ | 70/209 |
| 5,142,889 A | * | 9/1992 | Liu .............................. | 70/209 |
| 5,144,822 A | * | 9/1992 | Jan et al. ..................... | 70/209 |
| 5,174,138 A | * | 12/1992 | Shen ............................ | 70/209 |
| 5,179,849 A | * | 1/1993 | Wang ........................... | 70/209 |
| 5,230,232 A | * | 7/1993 | Yang ............................ | 70/209 |
| 5,267,458 A | * | 12/1993 | Heh ......................... | 70/209 X |
| 5,284,037 A | * | 2/1994 | Chen et al. ................... | 70/209 |
| 5,440,906 A | * | 8/1995 | Shen ............................ | 70/209 |
| 5,566,561 A | * | 10/1996 | Hucknall ..................... | 70/209 |
| 5,636,538 A | * | 6/1997 | Openiano ..................... | 70/209 |
| 5,678,433 A | * | 10/1997 | Riccitelli ..................... | 70/209 |
| 5,724,838 A | * | 3/1998 | Alicea ...................... | 70/209 X |
| 5,836,185 A | * | 11/1998 | Openiano ..................... | 70/209 |
| 6,176,110 B1 | * | 1/2001 | Hao ......................... | 70/226 X |

\* cited by examiner

*Primary Examiner*—Suzanne Dino Barrett
(74) *Attorney, Agent, or Firm*—Bacon & Thomas, PLLC

(57) ABSTRACT

A multi-sectional extendible lock structure for steering wheels. The structure includes a base portion having an inner space formed therein and having a fixing hook on the tailing end thereof; a middle rod section telescopically extending in the inner space of the base portion and also having an inner space with a fixing hook in opposition to the fixing hook on the base portion; a tailing rod section telescopically extending in the inner space of the middle rod section; a core rod extending in the tailing rod section and forming engagement between the middle rod section and the tailing rod section; and a lock barrel provided on the base portion with a locking pin thereof extending into the inner space of the base portion to make engagement with the middle rod section.

5 Claims, 11 Drawing Sheets

MULTI-SECTIONAL EXTENDIBLE LOCK STRUCTURE FOR STEERING WHEELS

BACKGROUND OF THE INVENTION

1. Field of the Invention

The present invention is related to a multi-sectional extendible lock structure for steering wheels, and especially to a multi-sectional lock structure for steering wheels capable of extending and contracting, by which, the lock can be pulled to elongate and fixedly fitted on a steering wheel to establish impedance in rotation of the steering wheel. Particularly when the sectional members of the lock are contracted into its base portion by the multi-sectional extending and contracting function, length of the lock can be largely reduced in favor of carrying and contracting and storage of the lock.

2. Description of the Prior Art

Conventional theft-proof devices need, in addition to the theft proofing function provided by door locks and power door locks of cars to prevent stealing the articles and activating the circuits in the cars, they need the function of, by cooperation of other theft-proof locks, avoiding stealing of cars easily by driving away after destroying the door locks and power door locks. Generally, in normal driving of a car, it needs suitable control on the steering wheel of the car to get good driving; if the steering wheel is locked to prevent it from smooth rotation, the car can not be steered well under the state of running of the car; this can make a thief difficult to steal the car. Thus such locking function makes more powerful measures to prevent the car from stealing.

There are lock structures each in the form of an extendible rod with a U shaped fixing hook on both ends thereof, the U shaped fixing hooks braces the steering wheel from inside outwardly thereof to make fixed locking of the lock on the steering wheel, a rod is extended out of the tailing end of the lock, so that when in rotation of the steering wheel, the rod will be abutted against the glass of the wind shield or a door of the car to prevent the steering wheel from complete rotation for controlling the rotational direction of the car. In this way, the car can have the theft-proofing function. However, the extendible rod on such a lock structure for steering wheels mostly is divided into two sections; in order to provide sufficient stopping effect on rotation of a steering wheel, each section of the rod requires quite a length, so that when the lock is contracted when not in use, a substantial length can still be left, this makes inconvenience in storage and carrying.

SUMMARY OF THE INVENTION

Thereby, the present invention is directed to a multi-sectional extendible lock structure for steering wheels. Wherein, the main body of the lock is comprised of a base portion, a middle rod section and a tailing rod section telescopically connecting one over the other. A lock barrel is provided to control the contracting action of the base portion and the middle rod section. The tailing rod section is extended therein a core rod, the tailing rod section is extended between the middle rod section and the core rod, the root portion of the tailing rod section is provided with through holes for inserting therein engaging beads. An annular groove is provided on the front end of the middle rod section for dropping therein the beads, while a protruding head is formed on the front end of the core rod in cooperation with a block provided on the bottom of an inner space of the base portion and capable of abutting the core rod. When the tailing rod section is pulled out of the middle rod section, the engaging beads on the root portion of the tailing rod section can be pushed into the annular groove from the protruding head formed on the front end of the core rod, the engaging beads thus provide engaging function for the middle rod section and the tailing rod section to prevent the tailing rod section from retracting into the middle rod section. Thereby, the lock can be completely stretched out. And a fixing hook is provided on both the base portion and the middle rod section in cooperation with each other to braces the steering wheel, and the tailing rod section can be pulled out of the middle rod section to act as a hindering member to prevent rotation of the steering wheel, thus the steering wheel is locked. And this is the main object of the present invention.

Another object of the multi-sectional extendible lock structure for steering wheels of the present invention is to provide between the tailing rod section and the middle rod section with an extension rod section to increase the length of extension of the whole lock, and each rod section can be shortened; thereby, the length of the whole lock when being contracted can be further reduced.

The present invention will be apparent after reading the detailed description of the preferred embodiment thereof in reference to the accompanying drawings.

DETAILED DESCRIPTION OF THE PREFERRED EMBODIMENT

Figure 1:
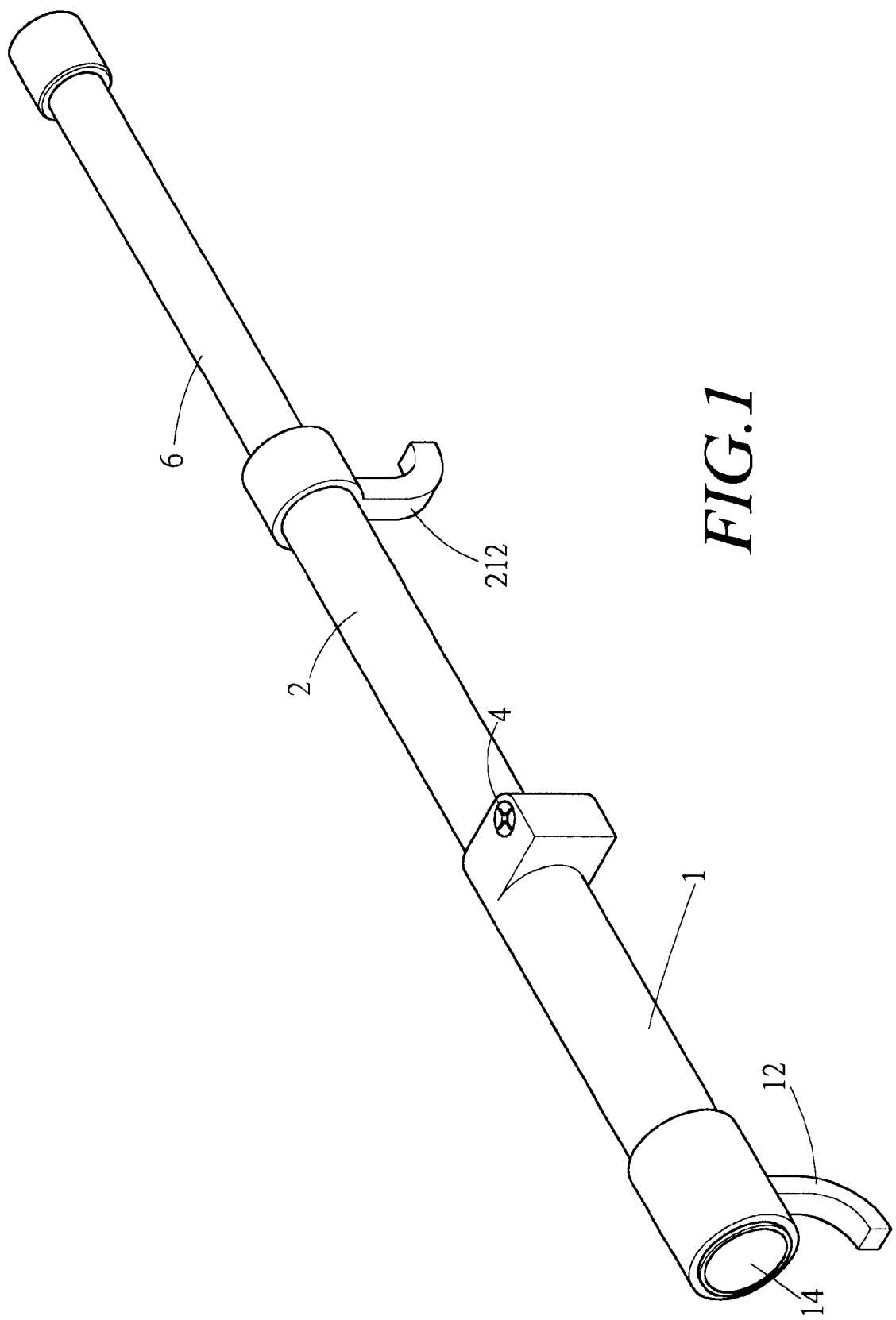
FIG. 1 is a perspective view showing the appearance of the lock of the present invention when it is stretched out.
Figure 2:
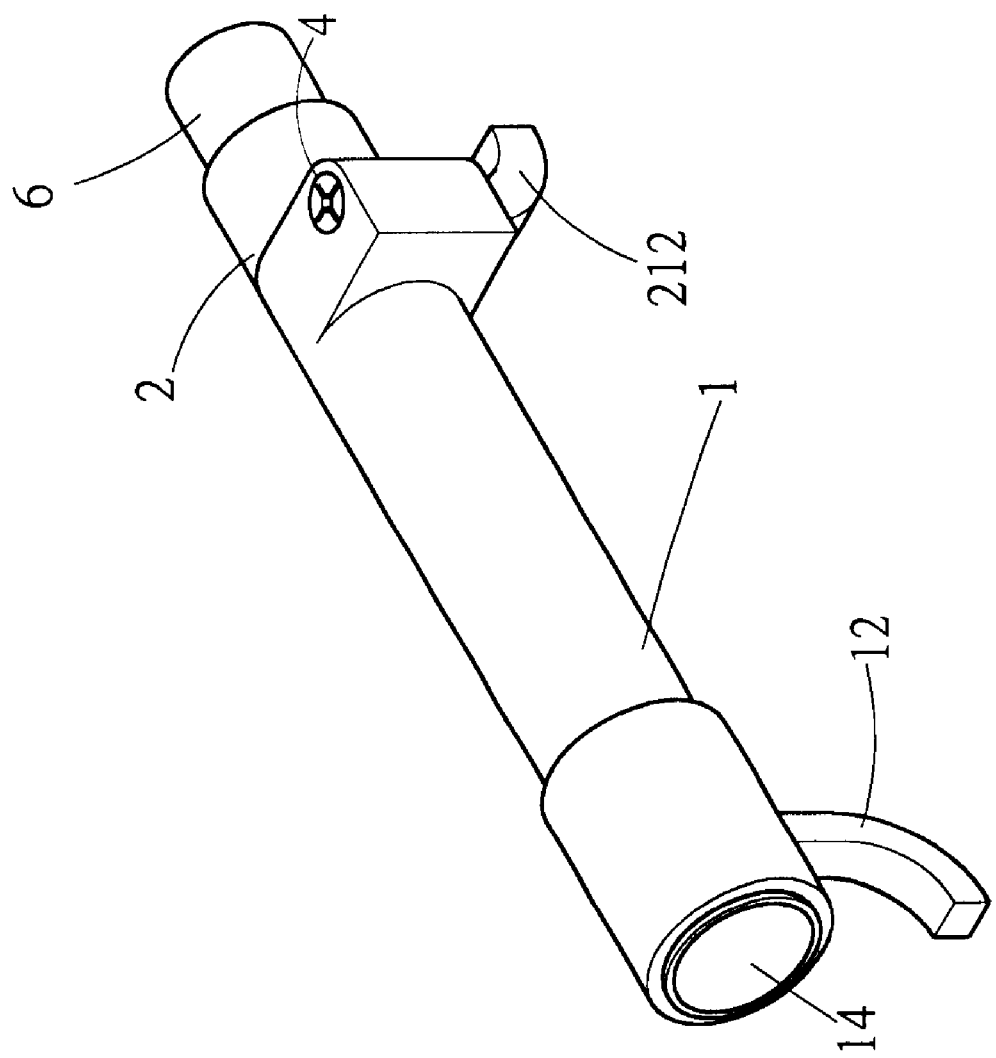
FIG. 2 is a perspective view showing the appearance of the lock of the present invention when it is contracted.

Referring the drawings, the basic structure of the multi-sectional extendible lock structure for steering wheels of the present invention is shown as depicted in FIG. 1, the main body of the whole lock is comprised of a base portion 1, a middle rod section 2 and a tailing rod section 6 telescopically connecting one over the other. As shown, the whole lock is stretched out, a fixing hook 12 (212) is provided on the ends respectively of the base portion 1 and the middle rod section 2 in cooperation with each other to brace the steering wheel from inside outwardly thereof (not shown); thereby, the whole lock is fixedly mounted on the steering wheel. The tailing rod section 6 can act as a hindering member to prevent rotation of the steering wheel, thus a function of locking the steering wheel is achieved. When the lock of the present invention is not in use, as is shown in FIG. 2, the lock can have the middle rod section 2 and the tailing rod section 6 retracted into the base portion 1 by taking advantage of the telescopic contracting function of the sections. Thereby, length of the lock can be largely reduced in favor of carrying and contracting and storage of the lock.

Figure 3:
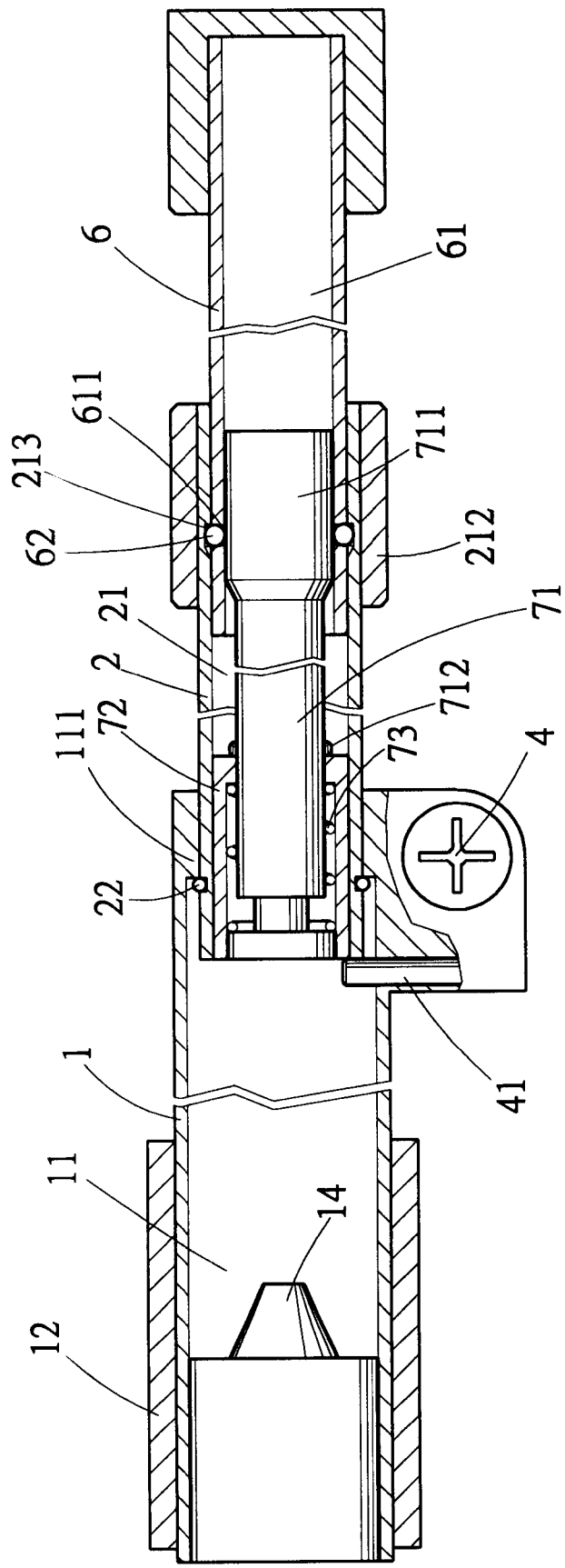
FIGS. 3–5 are schematic sectional views showing the actions of the sections of the lock of the present invention.

As to the detailed structure of the telescopically extending and contracting sections, can be seen in FIG. 3. Wherein, the base portion 1 has an inner space 11 formed therein; the middle rod section 2 also has an inner space 21. An end wall ill is provided on the opening of the inner space 11 of the base portion 1; and an engaging ring 22 is formed on the root portion of the middle rod section 2 to provide engaging action to prevent the middle rod section 2 from dropping off the base portion 1. A lock barrel 4 is provided near the opening of the base portion 1, a locking pin 41 of the lock barrel 4 is extended into the inner space 11 of the base portion 1 to make a stopping action against the root portion of the middle rod section 2 to prevent the middle rod section 2 from retracting into the base portion 1.

The tailing rod section 6 also has an inner space 61, a core rod 71 is extended in the inner space 61, the root portion of the core rod 71 is extended through a sleeve 72 to the end face of the root portion of the middle rod section 2, a spring member 73 is provided between to abut against the sleeve 72 and the core rod 71 to endue the core rod 71 with a pushing force toward the end face of the root portion of the middle rod section 2. The core rod 71 is provided with a stop pin 712 on the opposite side of the sleeve 72 to the side that the spring member 73 is abutted against, in order to prevent loosening of the core rod 71. The tailing rod section 6 is extended between the middle rod section 2 and the core rod 71, the root portion of the tailing rod section 6 is provided with through holes 611 for inserting therein engaging beads 62. An annular groove 213 is provided on the front end of the middle rod section 2 for dropping therein the beads 62, while a protruding head 711 is formed on the front end of the core rod 71 in cooperation with a block 14 provided on the bottom of the inner space 11 of the base portion 1 and capable of abutting the core rod 71. When the tailing rod section 6 is pulled out of the middle rod section 2, the engaging beads 62 on the root portion of the tailing rod section 6 can be pushed into the annular groove 213 from the protruding head 711 formed on the front end of the core rod 71, the engaging beads 62 thus provide engaging function for the middle rod section 2 and the tailing rod section 6 to prevent the tailing rod section 6 from retracting into the middle rod section 2. Thereby, the lock can be completely stretched out.

Figure 4:
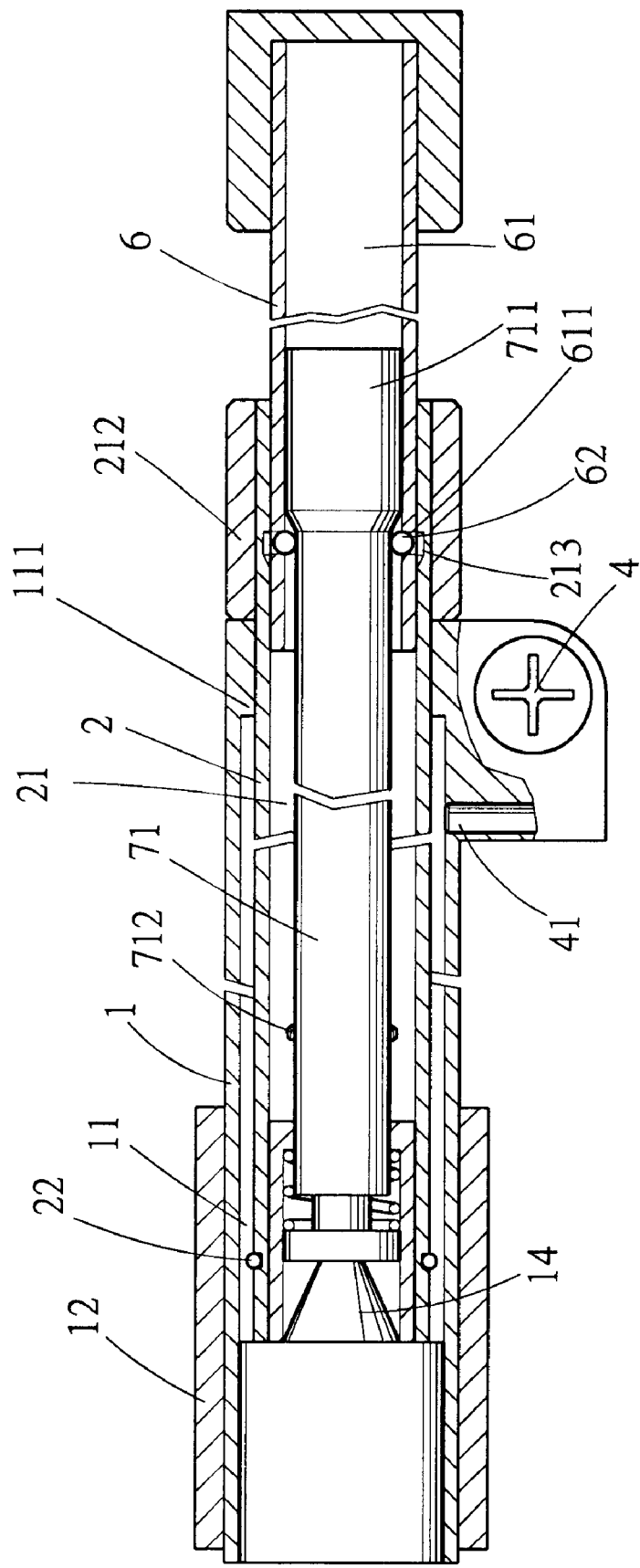
Figure 5:
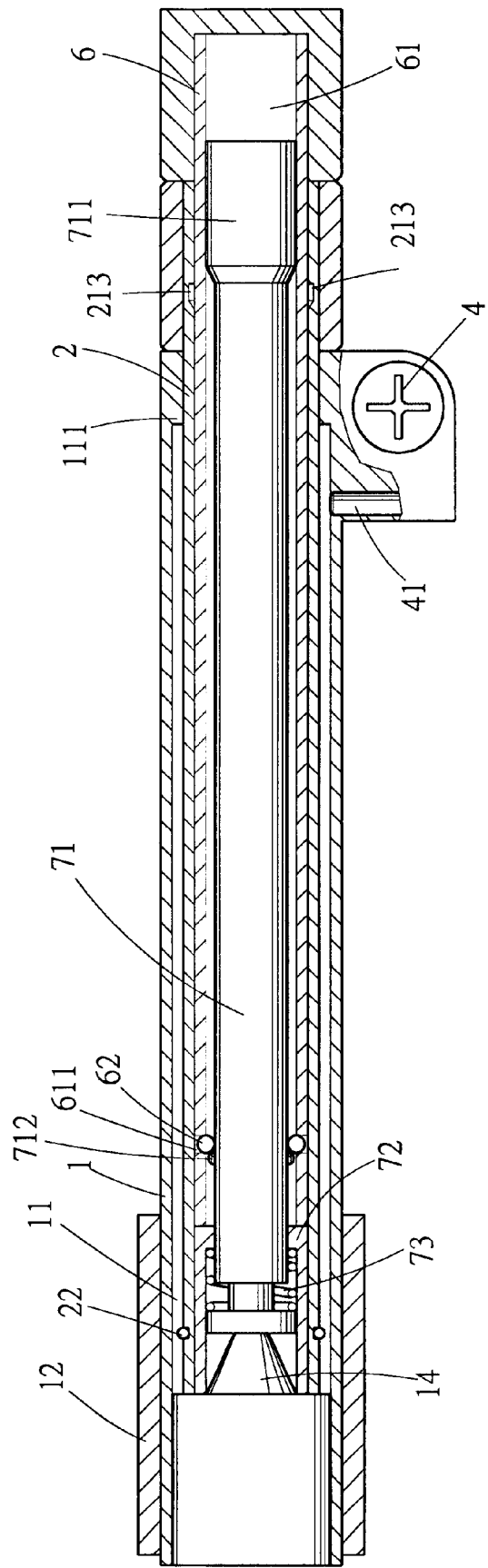

Referring simultaneously to FIGS. 3–5, when the lock of the present invention is completely stretched out, as shown in FIG. 3, by hindering of the lock pin 41 against retracting of the middle rod section 2, so that all the sections can get firm engagement to fix themselves in positions, strength of the locking structure can thus be ensured. Moreover, when the lock of the present invention is to be detached from the steering wheel and contracted, such as is shown in FIG. 4, it needs only that a key is used to open the lock barrel 4 to retract the lock pin 41 to release hindering against the middle rod section 2, then the middle rod section 2 can be pushed into the base portion 1. And when the middle rod section 2 is completely pushed to the bottom of the inner space 11 of the base portion 1, the block 14 provided on the bottom of the inner space 11 of the base portion 1 can press the core rod 71 in the tailing rod section 6 to move the core rod 71 toward the front end of the tailing rod section 6, such that the protruding head 711 formed on the front end of the core rod 71 moves over the position where the engaging beads 62 are. Then the engaging beads 62 can drop onto the straight shank of the core rod 71, at the same time, they get off the annular groove 213 of the middle rod section 2 to release engagement between the middle rod section 2 and the tailing rod section 6. And then the tailing rod section 6 is pushed into the middle rod section 2, finally, the middle rod section 2 and the tailing rod section 6 in the whole lock can both be completely contracted into the base portion 1 to largely reduce the length of the lock after contracting, and a user can be convenient in carrying and contracting and storage of the lock.

Figure 6:
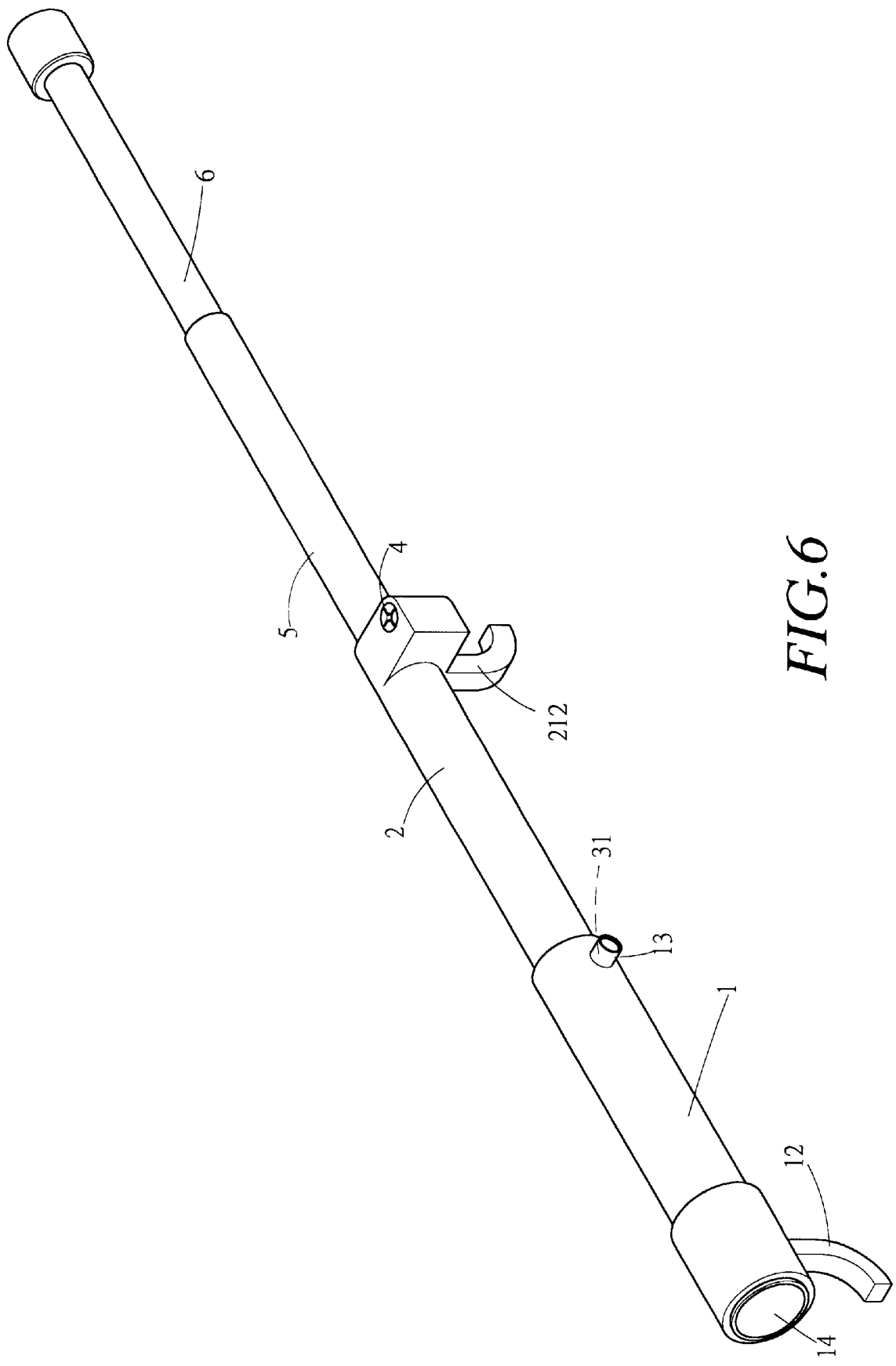
FIG. 6 is a perspective view showing the appearance of another embodiment of the lock of the present invention when it is stretched out.
Figure 11:
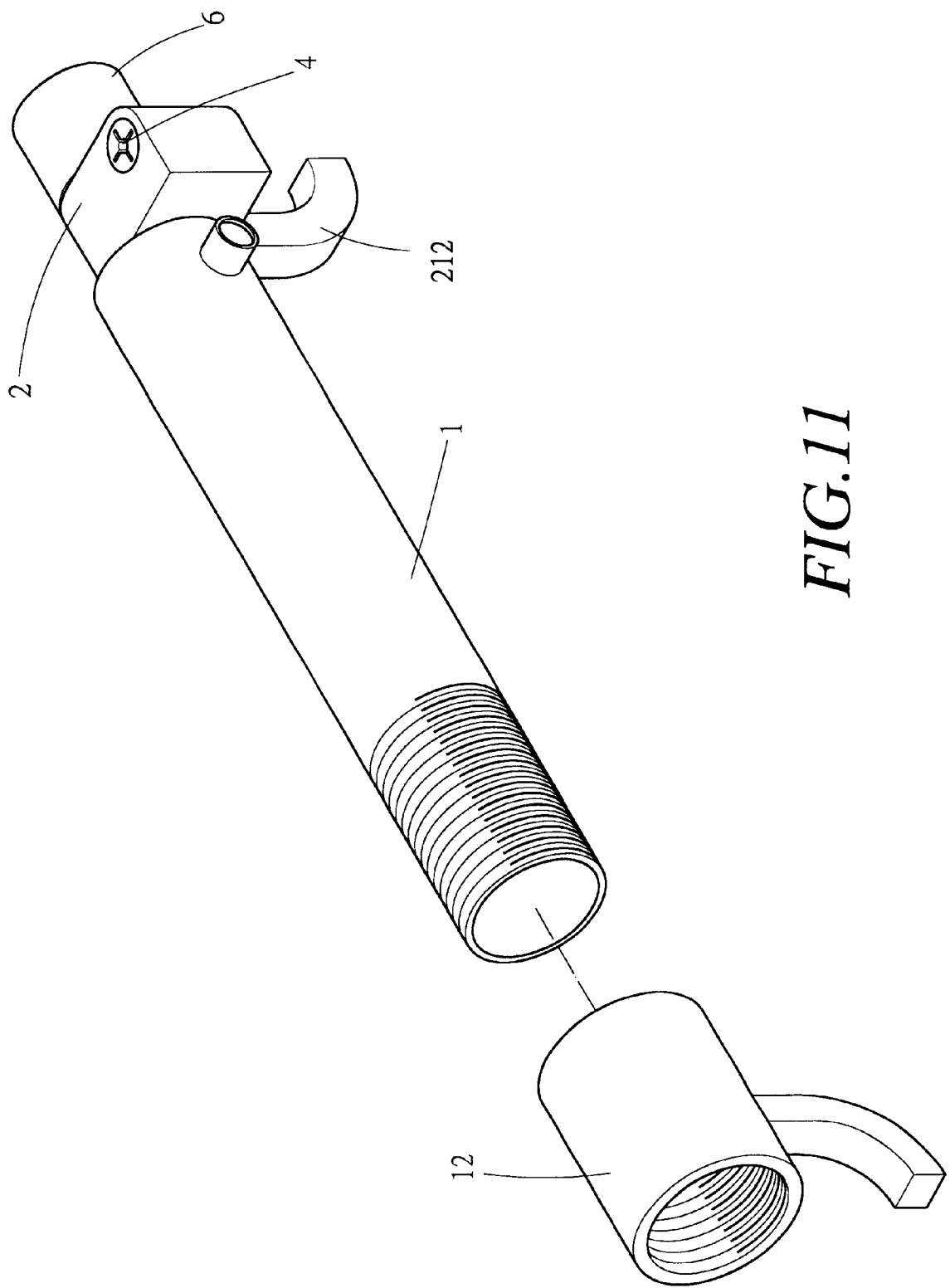
FIG. 11 is an analytic perspective view showing of a base portion and fixing hooks of the present invention.

And more, as shown in FIG. 6 which is a perspective view showing the appearance of another embodiment of the lock of the present invention when it is stretched out, an extension rod section 5 is provide between the tailing rod section 6 and the middle rod section 2 to increase the length of extension of the whole lock, and each rod section can be shortened; thereby, the length of the whole lock when being contracted can be further reduced. As shown in FIG. 11, wherein, the fixing hook 12 provided is connected by threads to the end of the base portion 1, the fixing hook 12 can be used to adjust position of itself on the base portion 1. The distance between the fixing hooks 12, 212 is adjustable in pursuance of the practical size of the steering wheel to get the best bracing action.

Figure 7:
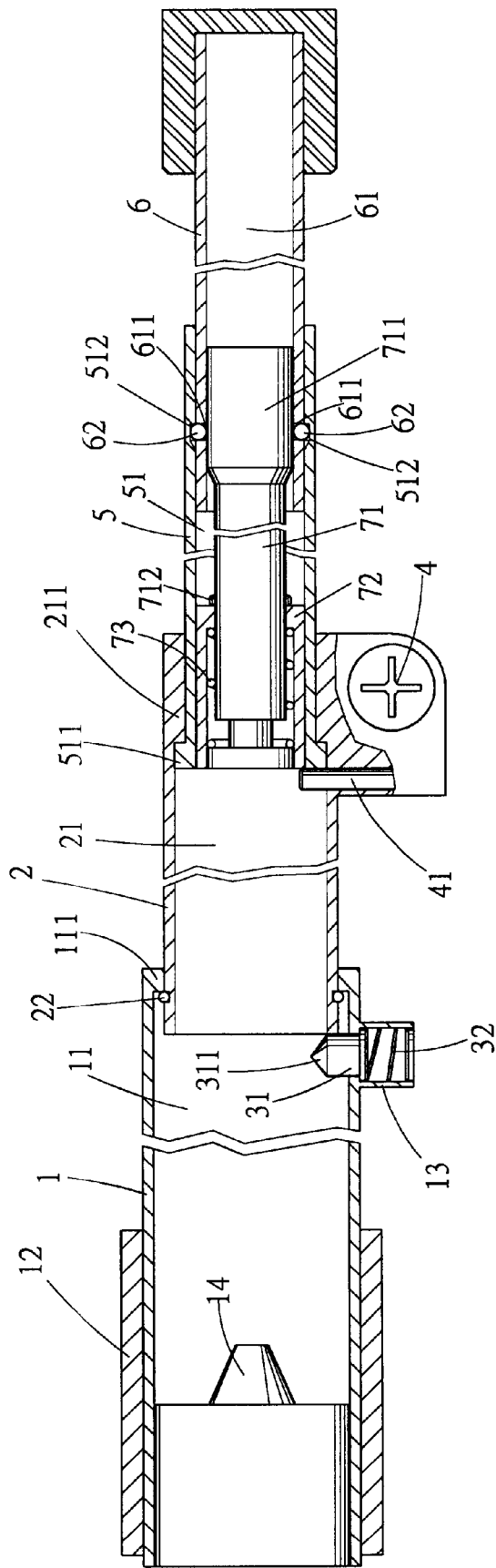
FIGS. 7–10 are schematic sectional views showing the actions of the sections of another embodiment of the lock of the present invention.

Referring to FIG. 7, wherein, a protruding chamber 13 is provided near the opening of the inner space 11 of the base portion 1 for receiving therein a conical member 31 and a spring member 32. The conical member 31 can be pushed by the spring member 32 to extend into the inner space 11 of the base portion 1 and is contractible, it can engage the middle rod section 2 to prevent contracting of the latter into the base portion 1. And the extension rod section 5 also has an inner space 51, the root portion of the extension rod section 5 is provided with a flange 511, while an end wall 211 is provided on the opening of the inner space 21 of the middle rod section 2 to prevent the extension rod section 5 from dropping. A lock barrel 4 is provided near the opening of the inner space 21 of the middle rod section 2, a locking pin 41 of the lock barrel 4 is extended into the inner space 21 of the middle rod section 2 to form hindering engagement with the end of the extension rod section 5, to thereby prevent the extension rod section 5 from retracting into the middle rod section 2, while the tailing rod section 6 is extended into the end of the extension rod section 5.

Similarly, the tailing rod section 6 also has an inner space 61, and a core rod 71 is extended in the inner space 61, one end of the core rod 71 is extended through a sleeve 72 to the end face of the root portion of the extension rod section 5, a spring member 73 is provided between to abut against the sleeve 72 and the core rod 71 to endue the core rod 71 with a pushing force toward the end face of the root portion of the extension rod section 5. The core rod 71 is provided with a stop pin 712 on the opposite side of the sleeve 72 to the side that the spring member 73 is abutted against, in order to prevent loosening of the core rod 71. The tailing rod section 6 is extended between the extension rod section 5 and the core rod 71, the root portion of the tailing rod section 6 is provided with through holes 611 for inserting therein engaging beads 62. An annular groove 512 is provided on the front end of the extension rod section 5 for dropping therein the beads 62, while a protruding head 711 is formed on the front end of the core rod 71 in cooperation with a block 14 provided on the bottom of the inner space 11 of the base portion 1 and capable of abutting the core rod 71. When the tailing rod section 6 is pulled out of the extension rod section 5, the engaging beads 62 on the root portion of the tailing rod section 6 can be pushed into the annular groove 512 of the extension rod section 5 from the protruding head 711 formed on the front end of the core rod 71, the engaging beads 62 thus provide engaging function for the extension rod section 5 and the tailing rod section 6 to prevent the tailing rod section 6 from retracting into the extension rod section 5.

Figure 8:
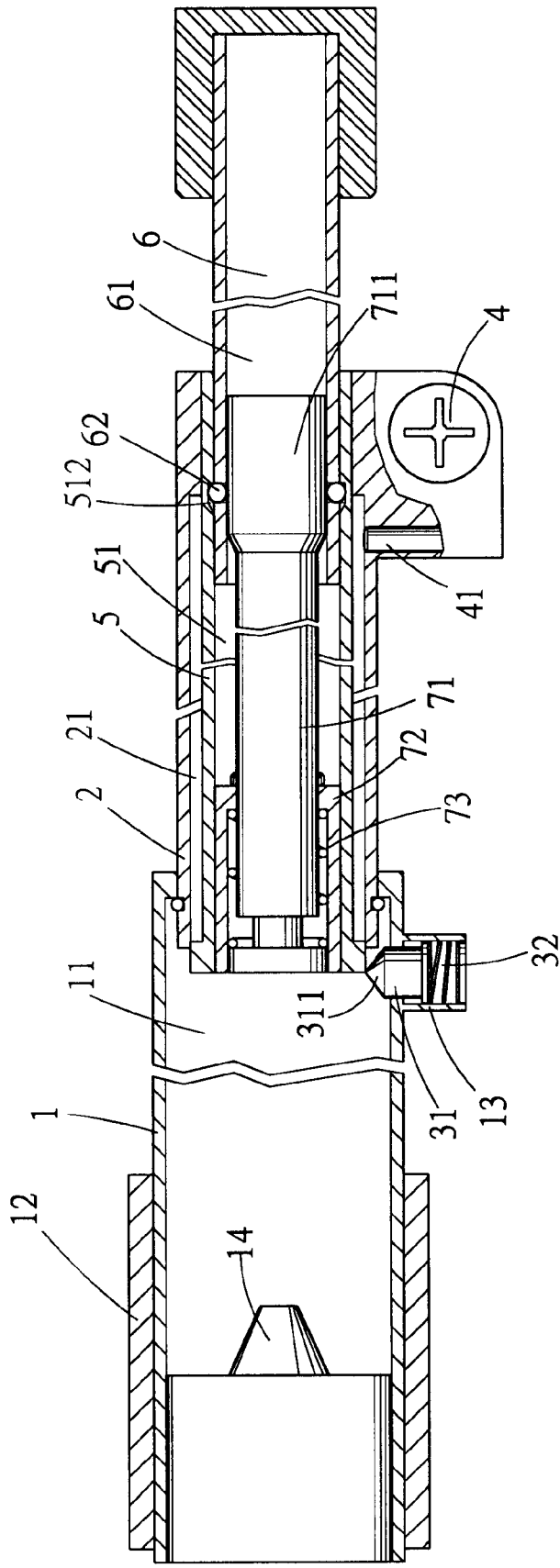
Figure 9:
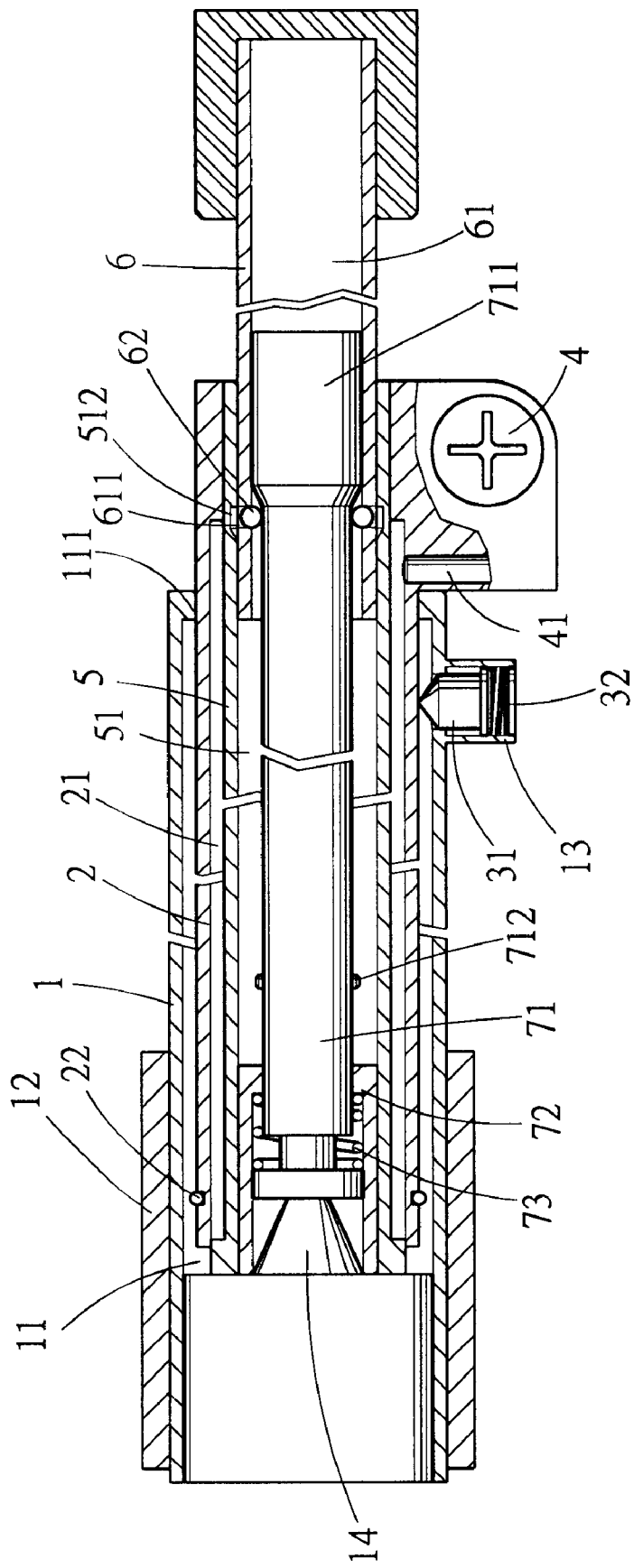
Figure 10:
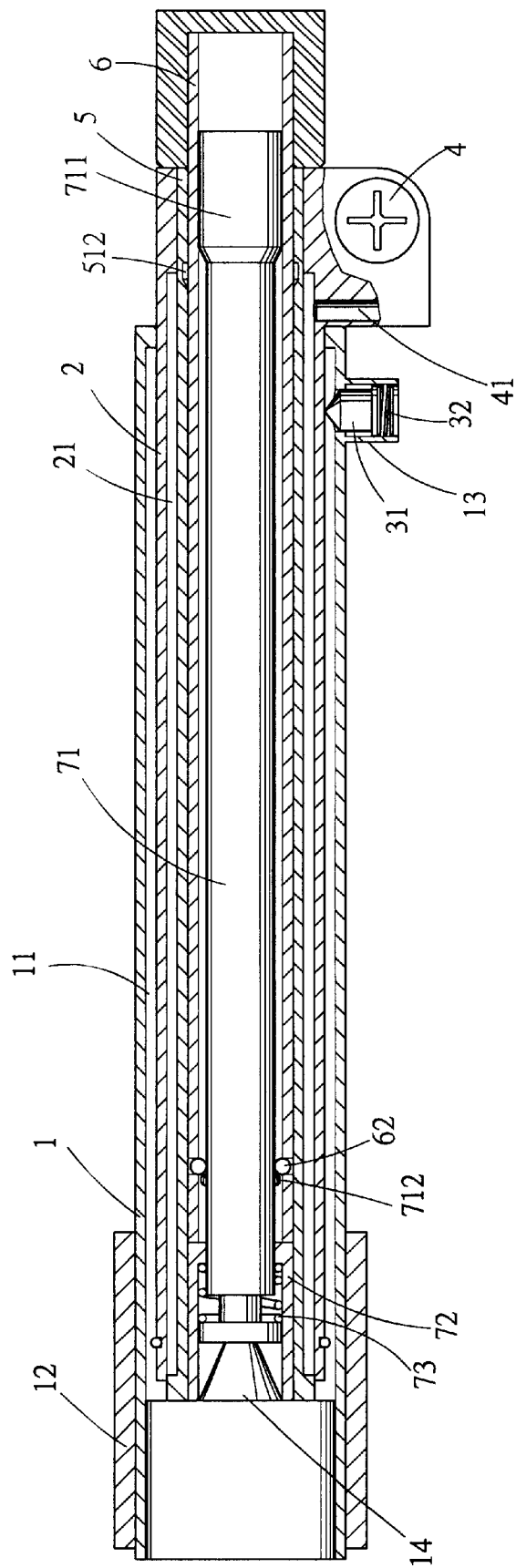

Referring again to FIG. 7, when another embodiment of the lock of the present invention is completely stretched out, engagement is formed respectively at the positions between the middle rod section 2 and the base portion 1, the extension rod section 5 and the middle rod section 2, as well as the tailing rod section 6 and the extension rod section 5 by means of the engaging beads on the conical member 31, the locking pin 41 of the lock barrel 4 and the tailing rod section 6. Thereby, all the sections of the whole lock are fixedly positioned to ensure strength of the locking structure. Further, when the lock of the present invention is to be contracted, such as is shown in FIG. 8, it needs only that a key is used to open the lock barrel 4 to retract the lock pin 41 to retract the extension rod section 5 toward the base portion 1. When the extension rod section 5 is completely retracted into the middle rod section 2, the root portion of the extension rod section 5 will protrude firstly out of the end face of the root portion of the middle rod section 2 a suitable distance to contact firstly a beveled surface 311 of the conical member 31 and to retract the conical member 31 for releasing engagement thereof with the middle rod section 2. Thus it can, as shown in FIG. 9, push the middle rod section 2 toward the interior of the inner space 11 of the base portion 1. When the middle rod section 2 and the extension rod section 5 are completely retracted to the bottom of the inner space 11 of the base portion 1, the block 14 provided on the bottom of the inner space 11 of the base portion 1 can press the core rod 71 in the tailing rod section 6 to move the core rod 71 toward the front end of the tailing rod section 6, such that the protruding head 711 formed on the front end of the core rod 71 moves over the position where the engaging beads 62 are. Then the engaging beads 62 can drop onto the straight shank of the core rod 71, at the same time, they get off the annular groove 512 of the extension rod section 5 to release engagement between the extension rod section 5 and the tailing rod section 6. And as shown in FIG. 10, then the tailing rod section 6 is pushed into the extension rod section 5, finally, the middle rod section 2, the extension rod section 5 and the tailing rod section 6 in the whole lock can all be completely contracted into the base portion 1.

The multi-sectional extendible lock structure for steering wheels of the present invention provides a conical member, a locking pin and engaging beads to control operation of all the sections, such that the whole lock needs only to open the lock barrel to make linking movement among all the members thereof for releasing engagement of the sections. The middle rod section, the extension rod section and the tailing rod section can all be retracted into the base portion to largely reduce the length of the lock after contracting, and to increase convenience in carrying and contracting and storage of the lock. Thus a preferred embodiment of lock for steering wheels is successfully provided.

Having thus described my invention, what I claim as new and desire to be secured by Letters Patent of the United States are:

1. A multi-sectional extendible lock structure for steering wheels comprising:

a base portion having an inner space formed therein and having a fixing hook on the tailing end thereof;

a middle rod section telescopically extending in said inner space of said base portion and also having an inner space with a fixing hook in opposition to said fixing hook on said base portion;

a tailing rod section telescopically extending in said inner space of said middle rod section;

a core rod extending in said tailing rod section and forming engagement between said middle rod section and said tailing rod section;

a lock barrel provided on said base portion with a locking pin thereof extending into said inner space of said base portion to make engagement with said middle rod section;

thereby, when said middle rod section is pulled out of said base portion, said fixing hooks are adapted to fixedly mounted on said steering wheel, then by pulling said tailing rod section out of said middle rod section, said steering wheel is locked in a car against rotation;

an end wall is provided on an opening of said inner space of said base portion; and an engaging ring is formed on a root portion of said middle rod section to provide engaging action to prevent said middle rod section from dropping off said base portion; said lock barrel is fixedly provided near said opening of said base portion, said locking pin of said lock barrel is extended into said inner space of said base portion to make a stopping action against said root portion of said middle rod section to prevent said middle rod section from retracting into said base portion; said core rod is extended in an inner space of said tailing rod section, one end of said core rod is extended through a sleeve to an end face of said root portion of said middle rod section, a spring member is provided between to abut against said sleeve and said core rod to endue said core rod with a pushing force toward said end face of said root portion of said middle rod section; said core rod is provided with a stop pin on the opposite side of said sleeve to the side that said spring member is abutted against, in order to prevent loosening of said core rod; said tailing rod section is extended between said middle rod section and said core rod, a root portion of said tailing rod section is provided with through holes for inserting therein engaging beads, an annular groove is provided on the front end of said middle rod section for dropping therein said beads, while a protruding head is formed on the front end of said core rod in cooperation with a block provided on the bottom of said inner space of said base portion and is adapted for abutting said core rod, when said tailing rod section is pulled out of said middle rod section, said engaging beads on a root portion of said tailing rod section are pushed into said annular groove from said protruding head formed on said front end of said core rod, said engaging beads thus provide engaging function for said middle rod section and said tailing rod section to prevent said tailing rod section from retracting into said middle rod section, thereby, said lock can be completely stretched out; when said middle rod section is completely retracted to the bottom of said inner space of said base portion, said block provided on said bottom of said inner space of said base portion presses said core rod in said tailing rod section to move said core rod toward the front end of said tailing rod section, such that said protruding head formed on the front end of said core rod moves over the position where said engaging beads are; then said engaging beads drop onto a straight shank of said core rod, at the same time, they get off said annular groove of said middle rod section to release engagement between said middle rod section and said tailing rod section.

2. A multi-sectional extendible lock structure for steering wheels comprising:

a base portion having an inner space formed therein and having a fixing hook on the tailing end thereof;

a middle rod section telescopically extending in said inner space of said base portion and also having an inner space with a fixing hook in opposition to said fixing hook on said base portion;

a tailing rod section telescopically extending in said inner space of said middle rod section;

a core rod extending in said tailing rod section and forming engagement between said middle rod section and said tailing rod section;

a lock barrel provided on said base portion with a locking pin thereof extending into said inner space of said base portion to make engagement with said middle rod section;

thereby, when said middle rod section is pulled out of said base portion, said fixing hooks are adapted to fixedly mounted on said steering wheel, then by pulling said tailing rod section out of said middle rod section, said steering wheel is locked in a car against rotation; and an extension rod section is provide between said tailing rod section and said middle rod section to increase the length of extension of said lock, and each of said rod sections is shortened; thereby, length of said lock when being contracted is further reduced.

3. The multi-sectional extendible lock structure for steering wheels as claimed in claim 2, wherein, an end wall is provided on an opening of said inner space of said base portion; and an engaging ring is formed on a root portion of said middle rod section to provide engaging action to prevent said middle rod section from dropping off said base portion; a protruding chamber is provided near an opening of said inner space of said base portion for receiving therein a conical member and a spring member, said conical member is pushed by said spring member to extend into said inner space of said base portion and is contractible; said extension rod section also has an inner space, a root portion of said extension rod section is provided with a flange, while an end wall is provided on an opening of said inner space of said middle rod section to prevent said extension rod section from dropping off said middle rod section; said lock barrel is provided near said opening of said inner space of said middle rod section, said locking pin of said lock barrel is extended into said inner space of said middle rod section to form hindering engagement with an end of said extension rod section; while said tailing rod section is extended into said end of said extension rod section; said core rod is extended in an inner space of said tailing rod section, a root portion of said core rod is extended through a sleeve to an end face of said root portion of said extension rod section, a spring member is provided between to abut against said sleeve and said core rod to endue said core rod with a pushing force toward said end face of said root portion of said extension rod section; said core rod is provided with a stop pin on the opposite side of said sleeve to the side that said spring member is abutted against, in order to prevent loosening of said core rod; said tailing rod section is extended between said extension rod section and said core rod, a root portion of said tailing rod section is provided with through holes for inserting therein engaging beads, an annular groove is provided on the front end of said extension rod section for dropping therein said beads, while a protruding head is formed on the front end of said core rod in cooperation with a block provided on the bottom of said inner space of said base portion and is adapted for abutting said core rod; when said tailing rod section is pulled out of said extension rod section, said engaging beads on said root portion of said tailing rod section are pushed into said annular groove of said extension rod section from said protruding head formed on said front end of said core rod, said engaging beads thus provide engaging function for said extension rod section and said tailing rod section to prevent said tailing rod section from retracting into said extension rod section; and when said extension rod section is completely retracted to the bottom of said inner space of said base portion, said block presses said core rod to move toward the front end of said tailing rod section, such that said protruding head formed on the front end of said core rod moves over the position where said engaging beads are; then said engaging beads drop onto a straight shank of said core rod to release engagement between said extension rod section and said tailing rod section, and to push said tailing rod section into said extension rod section.

4. A multi-sectional extendible lock structure for a steering wheel, the lock structure comprising:

a base portion having a first inner space formed therein and a first fixing hook on a tailing end thereof;

a middle rod section telescopically extendible within the first inner space of said base portion, the middle rod section having a second inner space with a second fixing hook directed away from the first fixing hook on the base portion;

a tailing rod section telescopically extendible within the second inner space of the middle rod section, the tailing rod having a third inner space;

a core rod extendible within the third inner space of the tailing rod section and the second inner space of the middle rod section, the core rod forming a detachable engagement between the middle rod section and the tailing rod section;

a lock barrel provided on the base portion with a locking pin extendible into the first inner space of the base portion to engage and lock with the middle rod section; and when the middle rod section is telescoped out of the base portion while being attached to the base portion, such that the first and second fixing hooks are securable on a steering wheel of a vehicle, and the tailing rod section is telescoped out of the middle rod section while being attached to the middle rod section, engagement of the locking pin in a locked position prevents longitudinal movement of the base portion, middle rod section and the tailing section.

5. The multi-sectional extendible lock structure for steering wheels as claimed in claim 4, wherein, the first fixing hook on the base portion is connected to the base portion by interlocking threads, the first fixing hook is adjustably positioned on the base portion, with distance between the first and second fixing hooks being adjustable to custom lock the lock structure on steering wheels of varying sizes.

* * * * *